United States Patent
Roeland et al.

(10) Patent No.: US 10,834,649 B2
(45) Date of Patent: Nov. 10, 2020

(54) RAN-CONTROLLED SELECTIVE HANDOVER BETWEEN FIRST AND SECOND RAN:S

(71) Applicant: Telefonaktiebolaget L M Ericsson (publ), Stockholm (SE)

(72) Inventors: Dinand Roeland, Sollentuna (SE); Stefan Rommer, Västra Frölunda (SE); Mattias Bergström, Stockholm (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 759 days.

(21) Appl. No.: 14/894,578

(22) PCT Filed: May 28, 2014

(86) PCT No.: PCT/SE2014/050660
§ 371 (c)(1),
(2) Date: Nov. 30, 2015

(87) PCT Pub. No.: WO2014/193303
PCT Pub. Date: Dec. 4, 2014

(65) Prior Publication Data
US 2016/0127964 A1 May 5, 2016

Related U.S. Application Data

(60) Provisional application No. 61/828,972, filed on May 30, 2013.

(51) Int. Cl.
H04W 4/00 (2018.01)
H04W 36/14 (2009.01)
(Continued)

(52) U.S. Cl.
CPC ....... *H04W 36/14* (2013.01); *H04W 36/0027* (2013.01); *H04W 36/30* (2013.01); *H04W 84/12* (2013.01); *H04W 88/06* (2013.01)

(58) Field of Classification Search
CPC . H04W 36/30; H04W 36/14; H04W 36/0083; H04W 88/06; H04W 36/08
(Continued)

(56) References Cited

U.S. PATENT DOCUMENTS

2008/0192925 A1* 8/2008 Sachs .................. H04L 12/5692
380/29
2008/0205345 A1* 8/2008 Sachs ................ H04W 36/0011
370/332
(Continued)

FOREIGN PATENT DOCUMENTS

WO 2011157129 A2 12/2011
WO 2011157152 A2 12/2011
(Continued)

OTHER PUBLICATIONS

Unknown, Author, "Consideration on offloading granularity", Huawei, HiSilicon, 3GPP TSG RAN WG2 Meeting #82, R2-131961, Fukuoka, Japan, May 20-24, 2013, 1-2.

*Primary Examiner* — Atique Ahmed
(74) *Attorney, Agent, or Firm* — Murphy, Bilak & Homiller, PLLC

(57) ABSTRACT

The present disclosure relates to a method, in a mobility function (MF) node. The method comprises receiving (S1) information about a mapping to a property, of each of a plurality of radio bearers of a radio device for carrying data traffic between the radio device and a first radio access network (RAN). The method also comprises determining (S2) based on the received (S1) information, that at least one of the radio bearers can be handed over to a second RAN. The method also comprises initiating (S3) a handover com- (Continued)

mand to the radio device instructing the radio device to hand over the at least one radio bearer to the second RAN.

15 Claims, 11 Drawing Sheets

(51) Int. Cl.
*H04W 36/00* (2009.01)
*H04W 36/30* (2009.01)
*H04W 84/12* (2009.01)
*H04W 88/06* (2009.01)

(58) Field of Classification Search
USPC .......................................................... 370/332
See application file for complete search history.

(56) References Cited

U.S. PATENT DOCUMENTS

| | | | | |
|---|---|---|---|---|
| 2009/0080382 A1* | 3/2009 | Chen | ................. | H04W 36/0016 370/331 |
| 2009/0316656 A1* | 12/2009 | Zhao | ..................... | H04W 28/22 370/331 |
| 2012/0224564 A1* | 9/2012 | Paisal | .................... | H04N 7/148 370/331 |
| 2013/0016696 A1* | 1/2013 | Adjakple | ............... | H04W 36/22 370/331 |
| 2013/0070596 A1 | 3/2013 | Yeh et al. | | |
| 2013/0083661 A1* | 4/2013 | Gupta | ................ | H04W 28/0247 370/235 |
| 2013/0107863 A1* | 5/2013 | Faccin | .............. | H04W 36/0022 370/331 |
| 2014/0071925 A1* | 3/2014 | Liu | ........................ | H04W 28/08 370/329 |
| 2014/0082697 A1* | 3/2014 | Watfa | ..................... | H04W 76/15 726/3 |
| 2014/0086211 A1* | 3/2014 | Liu | .......................... | H04L 45/38 370/331 |
| 2014/0119178 A1* | 5/2014 | Zhao | ................. | H04W 28/0263 370/230 |
| 2014/0119292 A1* | 5/2014 | Zhao | ..................... | H04W 36/14 370/329 |
| 2016/0050605 A1* | 2/2016 | Kim | ....................... | H04W 28/08 370/331 |

FOREIGN PATENT DOCUMENTS

| | | |
|---|---|---|
| WO | 2014148969 A1 | 9/2014 |
| WO | 2014148970 A1 | 9/2014 |
| WO | 2014168549 A1 | 10/2014 |

* cited by examiner

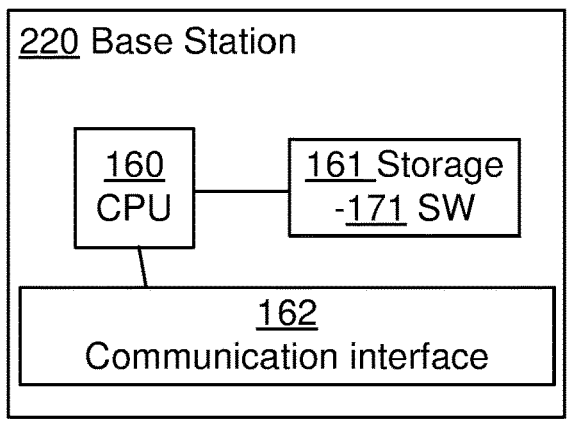
Fig. 16
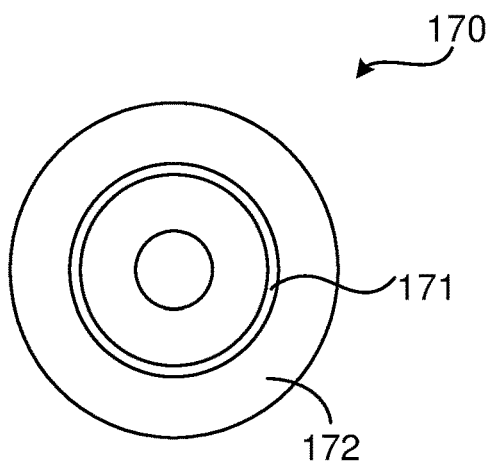
Fig. 17
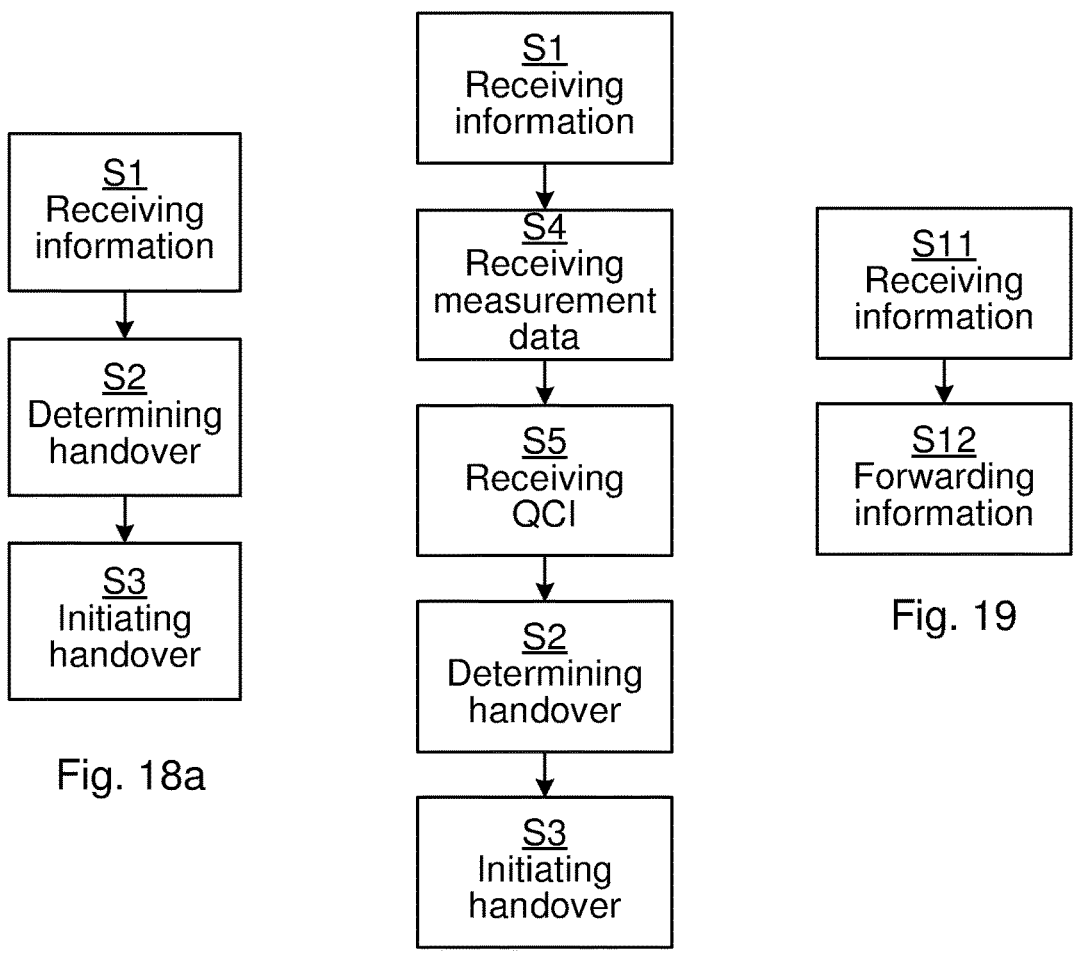
Fig. 18a
Fig. 18b
Fig. 19

RAN-CONTROLLED SELECTIVE HANDOVER BETWEEN FIRST AND SECOND RAN:S

TECHNICAL FIELD

The present disclosure relates generally to wireless devices that support multiple radio access technologies (RATs) and more particularly relates to the handing over of data traffic from one radio access network (RAN) to another with such a device.

BACKGROUND

The wireless local-area network (WLAN) technology known as "Wi-Fi" has been standardized by IEEE in the 802.11 series of specifications (i.e., as *"IEEE Standard for Information technology—Telecommunications and information exchange between systems. Local and metropolitan area networks—Specific requirements. Part 11: Wireless LAN Medium Access Control (MAC) and Physical Layer (PHY) Specifications"*). As currently specified, Wi-Fi systems are primarily operated in the 2.4 GHz or 5 GHz bands.

The IEEE 802.11 specifications regulate the functions and operations of the wireless access points (AP) or wireless terminals, collectively known as "stations" or "STA," in the IEEE 802.11 specification, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardized by the 3rd-Generation Partnership Project (3GPP), including the radio-access technologies known as Long-Term Evolution (LTE), Universal Mobile Telecommunications System/Wideband Code-Division Multiple Access (UMTS/WCDMA), and Global System for Mobile Communications (GSM), see Wi-Fi as a wireless technology that can provide good additional support for users in their regular cellular networks.

As used herein, the term "operator-controlled Wi-Fi" indicates a Wi-Fi deployment that on some level is integrated with a cellular network operator's existing network, where the operator's RAN(s) and one or more Wi-Fi wireless access points may even be connected to the same core network (CN) and provide the same or overlapping services. Currently, several standardization organizations are intensely active in the area of operator-controlled Wi-Fi. In 3GPP, for example, activities to connect Wi-Fi access points to the 3GPP-specified core network are being pursued. In the Wi-Fi alliance (WFA), activities related to certification of Wi-Fi products are undertaken, which to some extent are also driven from the need to make Wi-Fi a viable wireless technology for cellular operators to support high bandwidth offerings in their networks. In these standardization efforts, the term "Wi-Fi offload" is commonly used and indicates that cellular network operators seek means to offload traffic from their cellular networks to Wi-Fi, e.g., during peak-traffic-hours and in situations when the cellular network needs to be off-loaded for one reason or another, e.g., to provide a requested quality-of-service, to maximize bandwidth, or simply for improved coverage.

For a wireless operator, offering a mix of two technologies that have been standardized in isolation from each other raises the challenge of providing intelligent mechanisms for co-existence. One area that needs these intelligent mechanisms is connection management.

Many of today's wireless devices (referred to hereinafter as "user equipment" (UE) or "radio device" or "mobile terminal") support Wi-Fi in addition to one or several 3GPP cellular technologies. In many cases, however, these terminals essentially behave as two separate devices, from a radio access perspective. The 3GPP radio access network and the UE-based modems and protocols that are operating pursuant to the 3GPP specifications are generally unaware of the wireless access Wi-Fi protocols and modems that may be simultaneously operating pursuant to the 802.11 specifications. Techniques for coordinated control of these multiple radio-access technologies are needed.

In 3GPP radio access technologies, it is the network that decides when the mobile device shall handover from one cell to another cell. The network makes that decision based on radio measurement reports that the network requests from the mobile device and potential other information that is available to the network. As noted above, a number of activities are ongoing to integrate WLAN with the 3GPP architecture. In the latest specifications for 3GPP networks, 3GPP release 11 (Rel-11), this integration is still fairly "loose" and the decision when to handover between 3GPP radio access and WLAN is left to the mobile device. Work is ongoing now to change this by letting the network decide when to handover between 3GPP and WLAN.

When the network decides such handover, it also needs to decide what portion of this mobile device's traffic to handover. For example, some traffic may stay at the source access, and some traffic may be moved to the target access. Accordingly, improved techniques for deciding which traffic to handover are needed.

Fixed-Mobile Convergence (FMC) is a trend that has been on-going for many years now. The overall aim of FMC is to provide a seamless user experience; i.e., a particular service can be used anywhere, at any time. The user generally is not concerned with where the service is located or via which access technology the service is reached at a particular point in time. In the last few years, efforts on FMC have mainly focused on integration of WLAN (Wireless Local Area Network) with 3GPP (3rd Generation Partnership Project) technologies. The vision is a heterogeneous network, where WLAN is integrated into the 3GPP Evolved Packet Core (EPC) just like any other cellular radio-access technology (RAT).

One key driver for the integration of WLAN with 3GPP is the large growth in mobile broadband traffic. To accommodate this, the unlicensed WLAN spectrum can serve as a complement to the 3GPP RAT spectrum. Another driver is the wide support of WLAN in devices. Most modern mobile devices include both 3GPP radio and WLAN radio. Yet another driver is the desire from operators to support the same services regardless access.

A 3GPP UE (User Equipment, the 3GPP terminology for a mobile device) can attach to a non-3GPP access network (e.g., a WLAN access network) and get connected to one or more PDNs (Packet Data Networks) via the S2 interface. Each PDN connection is anchored in a 3GPP PGW (PDN Gateway). The UE receives one internet protocol (IP) address/prefix for each PDN connection. It is the PGW that assigns the address/prefix.

The S2 interface comes in three versions: S2a, S2b and S2c. The latter two overlay the non-3GPP access network and do not impact it. S2a is a more converged solution that does impact the non-3GPP access.

The FIGS. 1 and 2 describe the concepts of PDN, APN, PGW, SGW, PDN connection, EPS bearer, TWAG, AC and AP. See also 3GPP technical specification (TS) 23.402, "Architecture enhancements for non-3GPP accesses".

PDN is the packet data network, an IP network, typically Internet, but can alternatively be e.g. an IP multimedia subsystem (IMS) service network.

PGW is the PDN gateway, a functional node providing access to one or more PDNs.

A PDN connection provides the UE with an access channel to a PDN. It is a logical tunnel between the UE and the PGW. Each PDN connection has a single IP address/prefix. A UE can set up multiple PDN connections, to the same or different APN(s).

A PDN connection in a 3GPP access contains one or more EPS bearers, each of which is defined by a set of n-tuples with the same QoS profile. Each EPS bearer runs end-to-end between the UE and the PGW but is a concatenation of an S5 GTP tunnel (between PGW and serving gateway, SGW) and an S1 GTP tunnel (between SGW and an evolved Node B, eNB) and a radio bearer (between eNB and UE), as illustrated in the expanded (inlaid) part of FIG. 1. GTP stands for GPRS tunneling protocol, where GPRS is the general packet radio service.

FIG. 1 shows how bearers and PDN connections work over a 3GPP radio access. In a WLAN access network, only a subset of this is supported today in Rel-11. This is shown in FIG. 2, discussed below.

The PGW communicates via the S2a interface to the Trusted Wireless Access Gateway (TWAG), where a PDN connection contains one or more S2a bearers. S2a supports the bearer concept in which each bearer is a GTP tunnel.

In Rel-11, there is a restriction to have only one PDN connection over WLAN which does not support the bearer concept. Therefore, the S2a bearer is not end-2-end between the UE and the PGW as it is in a 3GPP access. However, WLAN includes the concept of Quality of Service (QoS) differentiation based on differentiated services code point (DSCP) in 802.11e.

In Rel-11, each PDN connection is a logical concatenation of one or more S2a GTP tunnels (between PGW and TWAG) and an L2 point-to-point link (between TWAG and UE).

WLAN Integration with EPC

One of the 3GPP work items in this area is referred to as SaMOG ("*Study on S2a Mobility based on GTP & WLAN access to EPC*"), see 3GPP technical report (TR) 23.852. The aim of SaMOG is to allow a UE to gain access to the 3GPP Evolved Packet Core (EPC) using WLAN as access technology. The SaMOG study is performed in two phases. The first phase has already been finalized and released as part of 3GPP Rel-11. The result is captured in 3GPP TS 23.402, section 16.2. The first phase of SaMOG provides only a limited functionality. No handover with IP address preservation between 3GPP and WLAN is supported. Also, the UE is restricted to have only a single PDN connection or a single offload connection via WLAN. The latter is used if an operator decides to offload the EPC; in such case an offload connection is setup. The UE's traffic is then not routed via EPC, but from the WLAN access network directly offloaded to the Internet. This is contrary to a PDN connection that is always routed via EPC.

The second phase of SaMOG is ongoing. Two main scenarios are being studied as part of the second phase. The first scenario, "single-PDN scenario", is a small extension to the Rel-11 baseline with added support for IP address preservation upon a handover between 3GPP and WLAN. The second scenario, "multi-PDN scenario", includes not only support for handover with IP address preservation, but also support for multiple PDN connections via WLAN, and support for having one or more PDN connection via 3GPP simultaneous with one or more offload connections via WLAN.

FIG. 3 illustrates in a baseline call flow for single-PDN scenario how a UE attaches to WLAN. This is a simplified copy of the call flow in 3GPP TS 23.402, section 16.2, with block 6 and handover support added as in the single-PDN scenario in SaMOG, 3GPP TR 23.852. Note that the figure shows the GTP option. Proxy Mobile IP (PMIP) is possible as well, as described in 3GPP TS 23.402.

FIG. 4 is a simplified copy of the multi-PDN scenario in SaMOG 3GPP TR 23.852. In this example, the first connection is an offload connection. Attachment parameters for the first connection are sent as part of authentication (step 2). A second connection, a PDN connection in this example, is setup in block 5. Note that the term "handover" used in this document in most cases refers to handover between 3GPP access and non-3GPP access.

Network-Instructed Attachment to WLAN

The SaMOG study defines how a UE attaches to the network and in particular how a PDN connection is setup via WLAN. It does not specify which access point (AP) the UE attaches to. Neither does it specify under which conditions the UE can attach to a specific AP. On a high level, there are two ways to control a UE when to attach, and to which AP:

1. The first method is based on policies in the UE. These policies may be pre-configured in the UE, or may be downloaded from a network node. In a 3GPP architecture, such a network node is called an Access Network Discovery and Selection Function (ANDSF). A policy rule may say, for example, "Attach to SSIDx when it is available". Work is ongoing to further extend and refine the ANDSF policies. An example of such a refined rule is to include performance measurements, such as "Attach to SSIDx only when the load of the AP is below a certain threshold". Such work is performed in 3GPP in the study "WLAN Network Selection" (WLAN_NS) of 3GPP TS 23.865. Similar work is performed within Wi-Fi Alliance and their HotSpot 2.0 program.

2. In the second method, it is the network that decides when and where the UE shall attach. It then instructs the UE to do so by an explicit command. This way, policies are kept inside the network. The network mobility function may make its decision based on measurements performed by the UE. E.g. the UE may be attached to LTE. The network then instructs the UE to take measurements of the WLAN APs it sees. After receiving the measurement results, the mobility function decides which AP the UE shall attach to. Finally, the mobility function explicitly instructs the UE to attach.

IFOM and MAPCON

The two FIGS. 5 and 6 briefly define what IFOM (IP flow mobility) and MAPCON (Multi Access PDN Connectivity) is. See 3GPP TS 23.402 for a more detailed description.

Referring to FIG. 5: IFOM capable UE is a UE that is capable of routing different IP flows to the same PDN connection through different access networks. TS 23.402 specifies how IFOM works. It does not specify when the UE shall attach to the second access. What to route via which access is specified in ANDSF rules. IFOM is today only specified for S2c (it is a DSMIP extension). A 3GPP SA2 study on S2a/S2b-IFOM is ongoing. The SA2 study has until now only addressed S2b, and may, once restarted, continue with IFOM for S2a. Today, there is no S2a-IFOM. The UE has a single IP address for the IFOM PDN connection, even though this connection can be routed over two accesses.

Referring to FIG. 6: MAPCON capable UE is a UE that is capable of routing different simultaneously active PDN connections through different access networks. TS 23.402 specifies how MAPCON works. It does not specify when the UE shall attach to the second access. What to route via which access is specified in ANDSF rules. The UE sets up two PDN connections, one per access. Therefore, the UE has two IP addresses.

Once again, when the network decides to handover between 3GPP and WLAN, it also needs to decide what portion of this mobile device's traffic to handover. For instance, some traffic may stay at the source access, and some traffic may be moved. Techniques for the radio access network to decide what traffic to handover are needed.

SUMMARY

The techniques detailed herein are based on an approach whereby the network e.g. the cellular RAN decides when the radio device (e.g., 3GPP UE) should attach to which AP of a WLAN. The mechanisms described include a signal "handover command" that may carry an information element that instructs the UE what to handover.

When the network instructs the radio device what to handover, a number of different granularities may be considered, e.g.:

1. Handover all traffic.
2. Handover all traffic belonging to a specific APN.
3. Handover all traffic belonging to a specific PDN connection.
4. Handover all traffic belonging to a specific bearer within a specific PDN connection.

Scenario 1 is covered in the prior art. The techniques detailed in the present disclosure are directed to scenarios 2, 3 and 4. The techniques are tailored for a RAN-based solution, i.e., a solution when the RAN is controlling handovers.

The terminology used herein assumes a 3GPP Evolved Packet System (EPS) network. However, the methods described may apply just as well to other 3GPP Radio Access Technologies (RATs). Accordingly, references to an eNodeB or eNB, the LTE base station, may be understood to apply as well to a UMTS Node B or a radio network controller (RNC).

According to an aspect of the present disclosure, there is provided a method, in a mobility function (MF) node in a communication network. The method comprises receiving information about a mapping to a property, of each of a plurality of radio bearers of a radio device for carrying data traffic between the radio device and a first radio access network (RAN). The method also comprises determining, based on the received information, that at least one of the radio bearers can be handed over to a second RAN. The method also comprises initiating a handover command to the radio device instructing the radio device to hand over the at least one radio bearer to the second RAN.

According to another aspect of the present disclosure, there is provided a method, performed in a base station of a cellular RAN. The method comprises receiving information about a mapping to a property, of each of a plurality of radio bearers of a radio device for carrying data traffic between the radio device and the cellular RAN. The method also comprises forwarding the mapping information to an MF node for use in determining that at least one of the radio bearers can be handed over to a wireless local area network (WLAN) RAN.

According to another aspect of the present disclosure, there is provided a mobility function (MF) node for a communication network. The MF node comprises a communication interface configured for communicating with one or more nodes of at least a first RAN, processing circuitry, and a storage unit storing instructions executable by said processing circuitry whereby said MF node is operative to receive information about a mapping to a property, of each of a plurality of radio bearers of a radio device for carrying data traffic between the radio device and a first RAN. The MF node is also operative to determine, based on the received information, that at least one of the radio bearers can be handed over to a second RAN. The MF node is also operative to initiate a handover command to the radio device instructing the radio device to handover the at least one radio bearer to the second RAN.

According to another aspect of the present disclosure, there is provided a base station for a cellular RAN. The base station comprises a radio communication interface for communication with a radio device, processing circuitry, and a storage unit storing instructions executable by said processing circuitry whereby said base station is operative to receive information about a mapping to a property, of each of a plurality of radio bearers of the radio device for carrying data traffic between the radio device and the cellular RAN. The base station is also operative to forward the mapping information to an MF node for use in determining that at least one of the radio bearers can be handed over to a WLAN RAN.

According to another aspect of the present disclosure, there is provided a computer program product comprising computer-executable components for causing an MF node to perform an embodiment of a method of the present disclosure when the computer-executable components are run on processor circuitry comprised therein.

According to another aspect of the present disclosure, there is provided a computer program product comprising computer-executable components for causing a base station to perform an embodiment of a method of the present disclosure when the computer-executable components are run on processor circuitry comprised therein.

According to another aspect of the present disclosure, there is provided a computer program comprising computer program code which is able to, when run on processor circuitry of an MF node, cause the node to receive information about a mapping to a property, of each of a plurality of radio bearers of a radio device for carrying data traffic between the radio device and a first RAN. The code is also able to cause the node to determine, based on the received information, that at least one of the radio bearers can be handed over to a second RAN. The code is also able to cause the node to initiate a handover command to the radio device instructing the radio device to handover the at least one radio bearer to the second RAN.

According to another aspect of the present disclosure, there is provided a computer program comprising computer program code which is able to, when run on processor circuitry of a base station, cause the base station to receive information about a mapping to a property, of each of a plurality of radio bearers of a radio device for carrying data traffic between the radio device and the cellular RAN. The code is also able to cause the base station to forward the mapping information to an MF node for use in determining that at least one of the radio bearers can be handed over to a WLAN RAN.

According to another aspect of the present disclosure, there is provided a computer program product comprising an embodiment of a computer program of the present disclosure and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 16 is a schematic block diagram of an embodiment of a base station, in accordance with the present disclosure.

FIG. 17 schematically illustrates an embodiment of a computer program product, in accordance with the present disclosure.

FIG. 18a is a schematic flow chart of an embodiment of a method of the present disclosure.

FIG. 18b is a schematic flow chart of another embodiment of a method of the present disclosure.

FIG. 19 is a schematic flow chart of another embodiment of a method of the present disclosure.

DETAILED DESCRIPTION

Figure 1:
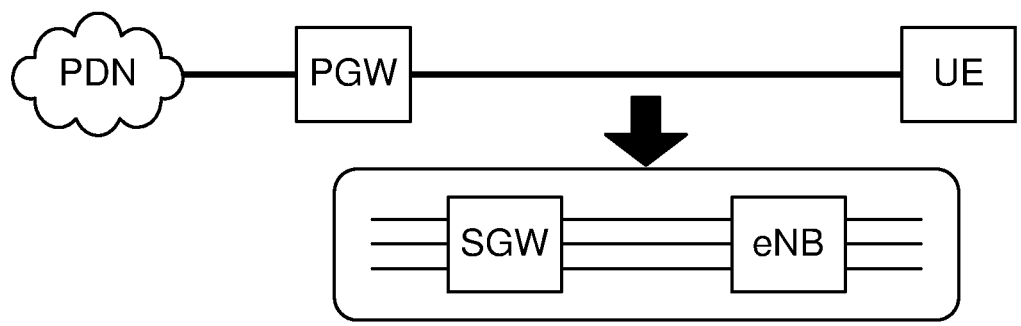
FIG. 1 schematically illustrates a PDN connection over a 3GPP access.
Figure 2:
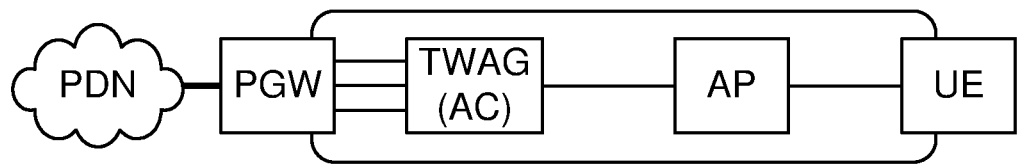
FIG. 2 schematically illustrates a PDN connection over a WLAN access.
Figure 3:
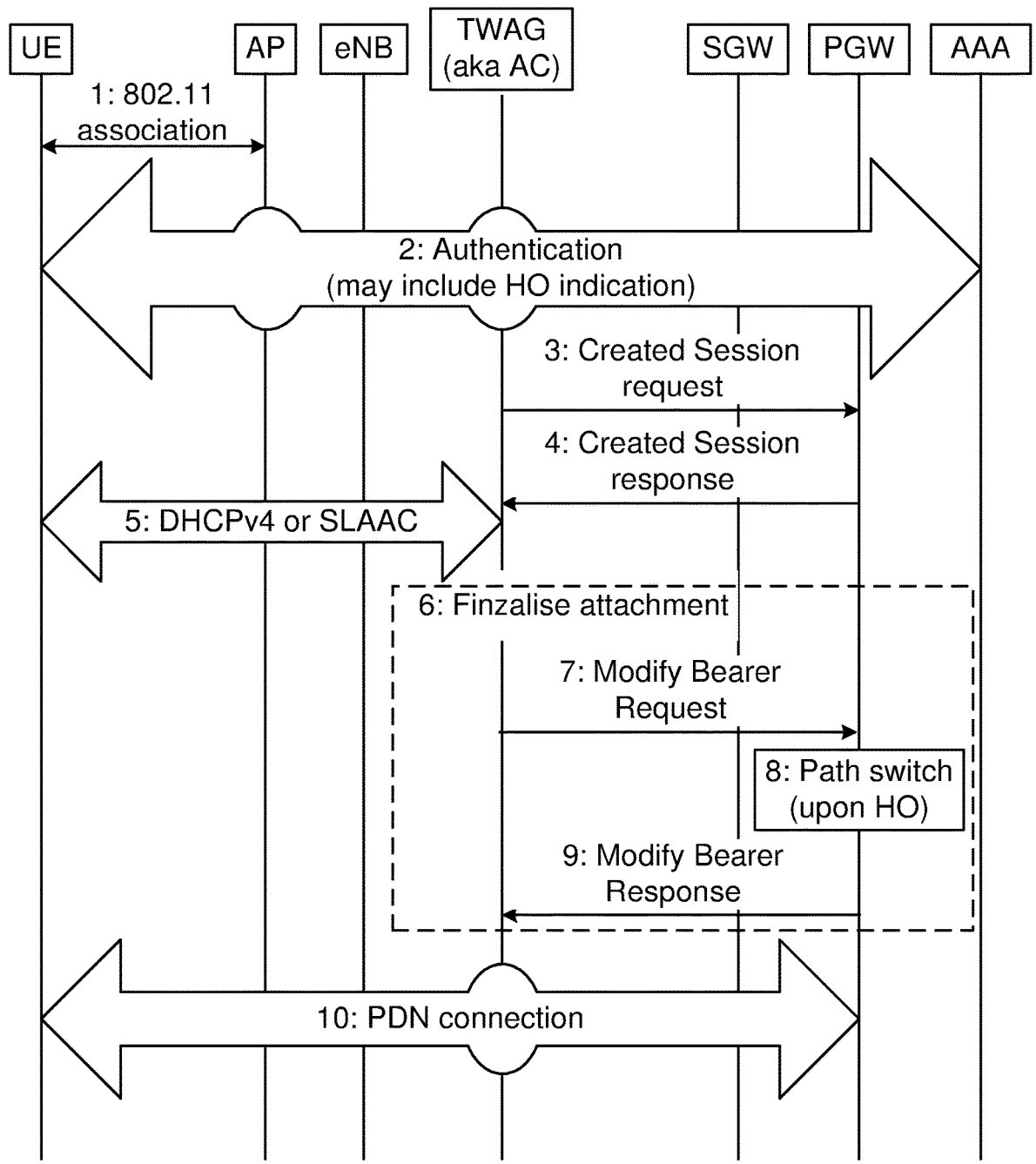
FIG. 3 is a schematic call flow in a single-PDN scenario.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

In the discussion that follows, specific details of particular embodiments of the present disclosure are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analogue and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present disclosure may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "UEs," which is the 3GPP term for end user radio devices. It should be appreciated, however, that the techniques and apparatus described herein are not limited to 3GPP UEs, but are more generally applicable to end user wireless devices (e.g., portable cellular telephones, smartphones, wireless-enabled tablet computers, etc.) that are useable in cellular systems. It should also be noted that the current disclosure relates to end user wireless devices that support both a wireless local area network (WLAN) technology, such as one or more of the IEEE 802.11 standards, and a wide-area cellular technology, such as any of the wide-area radio access standards maintained by 3GPP. End user devices are referred to in Wi-Fi document as "stations," or "STA"—it should be appreciated that the term "UE" as used herein should be understood to refer to a STA, and vice-versa, unless the context clearly indicates otherwise.

As noted above, many smartphones on the market today support Wi-Fi connectivity in addition to supporting one or more cellular radio-access technologies (RATs), such as the several RATs standardized by 3GPP. In an operator controlled Wi-Fi scenario, a UE may usually be served with communication through the cellular 3GPP network. Occasionally, e.g., when moving indoors, or when cellular performance deteriorates and there is good Wi-Fi coverage, it would be advantageous, from a network-performance perspective or a user-experience perspective, or both, for the UE to receive services through Wi-Fi instead of through the 3GPP radio access network.

Figure 7:
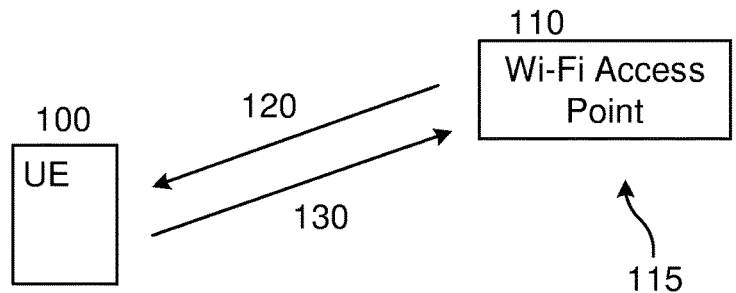
FIG. 7 schematically illustrates communication between a radio device and a WLAN AP, in accordance with the present disclosure.

FIG. 7 illustrates a radio device/UE 100 able to communicate, using 802.11-specified protocols, with a Wi-Fi access point 110 of a WLAN RAN 115. Downlink communication 120 is directed from the Wi-Fi access point 110 to the UE 100, while uplink communication 130 is directed from the UE 100 to the Wi-Fi access point 110.

For the radio device 100 to find an access point to connect to, a beacon signal may be transmitted from the Wi-Fi access point 110. This beacon signal indicates details about the access point and provides the radio device with enough information to be able to send a request for access. Accessing a Wi-Fi access point includes an information exchange between UE 100 and Wi-Fi Access point 110, including, for example, probe requests and responses, and authentication requests and response. The exact content of these sequences are omitted for clarity.

Figure 8:
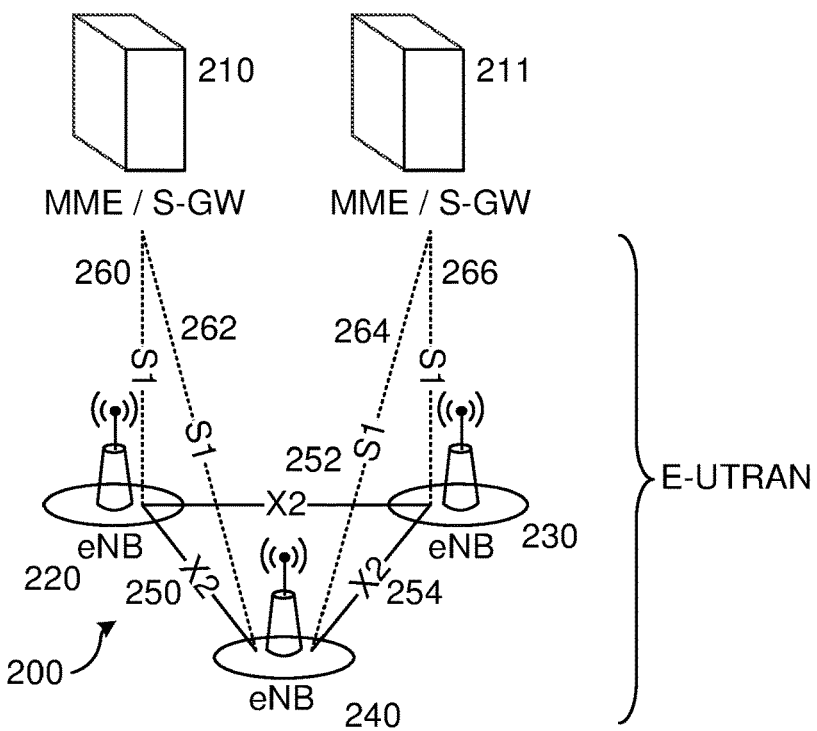
FIG. 8 schematically illustrates an embodiment of a cellular RAN, in accordance with the present disclosure.

FIG. 8 illustrates a portion of the LTE radio access network 200 and controller nodes. The LTE network is more formally known as the Evolved UMTS Terrestrial Radio Access Network (E-UTRAN), and includes base stations 220, 230, 240, called enhanced NodeBs (eNBs or eNodeBs), which provide the E-UTRA user plane and control plane protocol terminations towards the User Equipment (UE) 100. The eNBs are interconnected with each other by means of the X2 interface 250, 252, 254. The eNBs are also connected by means of the S1 interface 260, 262, 264, 266 to the Evolved Packet Core (EPC), and more specifically to Mobility Management Entities (MMEs) 210, 211 of a core network, by means of the S1-MME interface, and to the Serving Gateway (S-GW) 210, 211 by means of the S1-U interface. The S1 interface supports many-to-many relation between MMEs/S-GWs and eNBs.

The eNB hosts functionalities such as Radio Resource Management (RRM), radio bearer control, admission control, header compression of user plane data towards serving gateway, and routing of user plane data towards the serving gateway. The MME is the control node that processes the signalling between the UE and the core network. The main functions of the MME are related to connection management and bearer management, which are handled via Non Access Stratum (NAS) protocols. The PGW is the anchor point for UE mobility, and also includes other functionalities such as temporary DL data buffering while the UE is being paged, packet routing and forwarding the right eNB, gathering of information for charging and lawful interception. A PDN Gateway (P-GW), not shown in FIG. 8, is the node responsible for UE IP address allocation, as well as for Quality-of-Service (QoS) enforcement.

Figure 9:
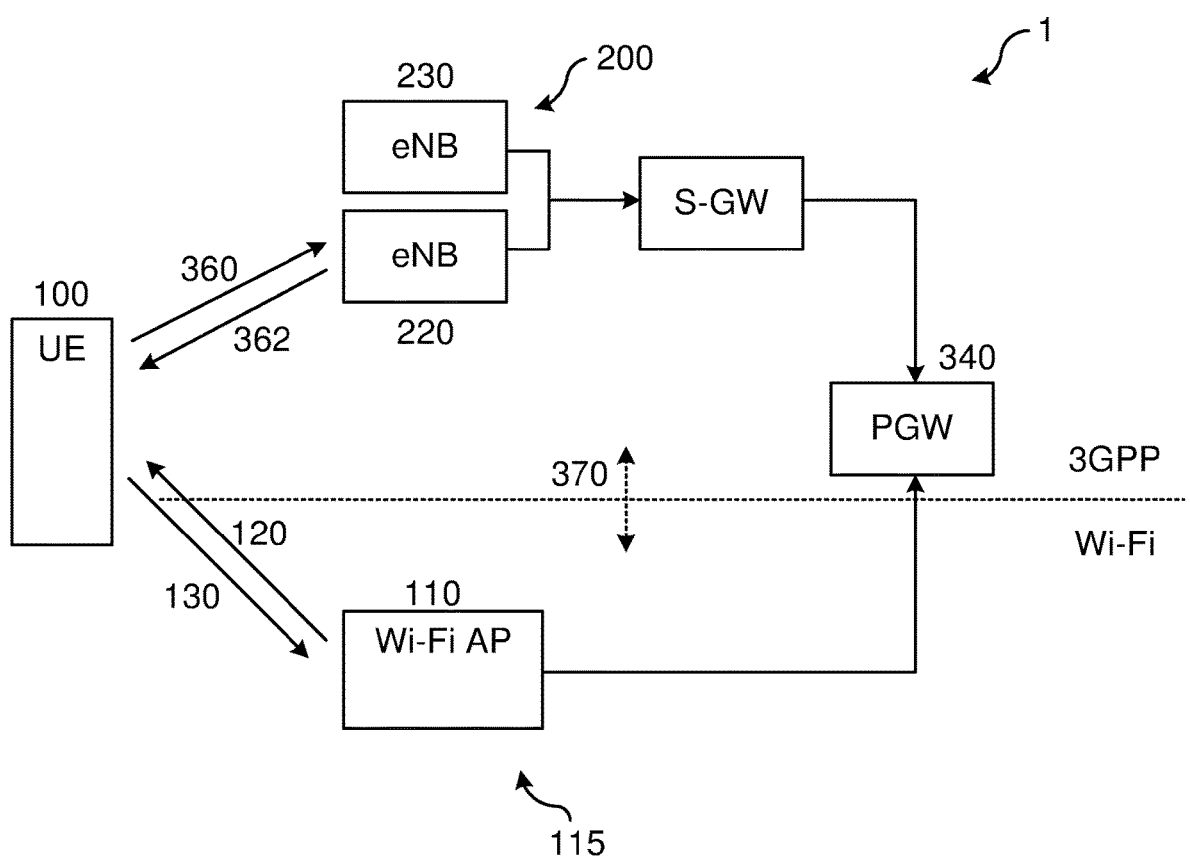
FIG. 9 is a schematic block diagram of an embodiment of a communication network, in accordance with the present disclosure.

FIG. 9 illustrates a communication network 1 where the LTE radio access parts 220, 230 of the LTE RAN 200 and a Wi-Fi wireless access point 110 of the WLAN 115 are both connected to the same P-GW 340. A UE 100 is capable of being served both from the Wi-Fi Access Point 110 and the LTE eNBs 220, 230. FIG. 9 illustrates one possible way of connecting a Wi-Fi access network 115 to the same core network as the 3GPP-specified access network 200. It should be noted that the presently disclosed techniques are not restricted to scenarios where the Wi-Fi access network is connected in this way; scenarios where the networks are more separate, e.g., as illustrated in FIGS. 7 and 8, are also possible scenarios.

There can be an interface 370 between the Wi-Fi and 3GPP domains, whereby the two networks (cellular 200 and WLAN 115) can exchange information that can be used to facilitate on steering traffic over the right network. One example of such information exchanged via the interface 370 is load conditions in the two networks. The two networks can also exchange information with regard to the context of the UE 100, so that each can be aware of whether the UE is being served by the other network, as well as some details of the connection over the other network (e.g. traffic volume, throughput, etc. . . . )

It should be noted that an access-point controller (AC) functionality exists in the Wi-Fi domain that controls the Wi-Fi AP. This functionality, though not depicted in the figure for the sake of clarity, can be physically located in 110, 340 or another separate physical entity.

RAN-Controlled Handover of all UE Traffic Belonging to an APN

The call flow of FIGS. 10A, 10B, 11, and 12 describes how a RAN-controlled handover of all UE traffic to a particular APN would work. There is a mobility function (MF) that decides when to handover traffic between the accesses. The MF may be co-located with another functional unit, e.g., the base station (e.g. eNB).

Figure 10A:
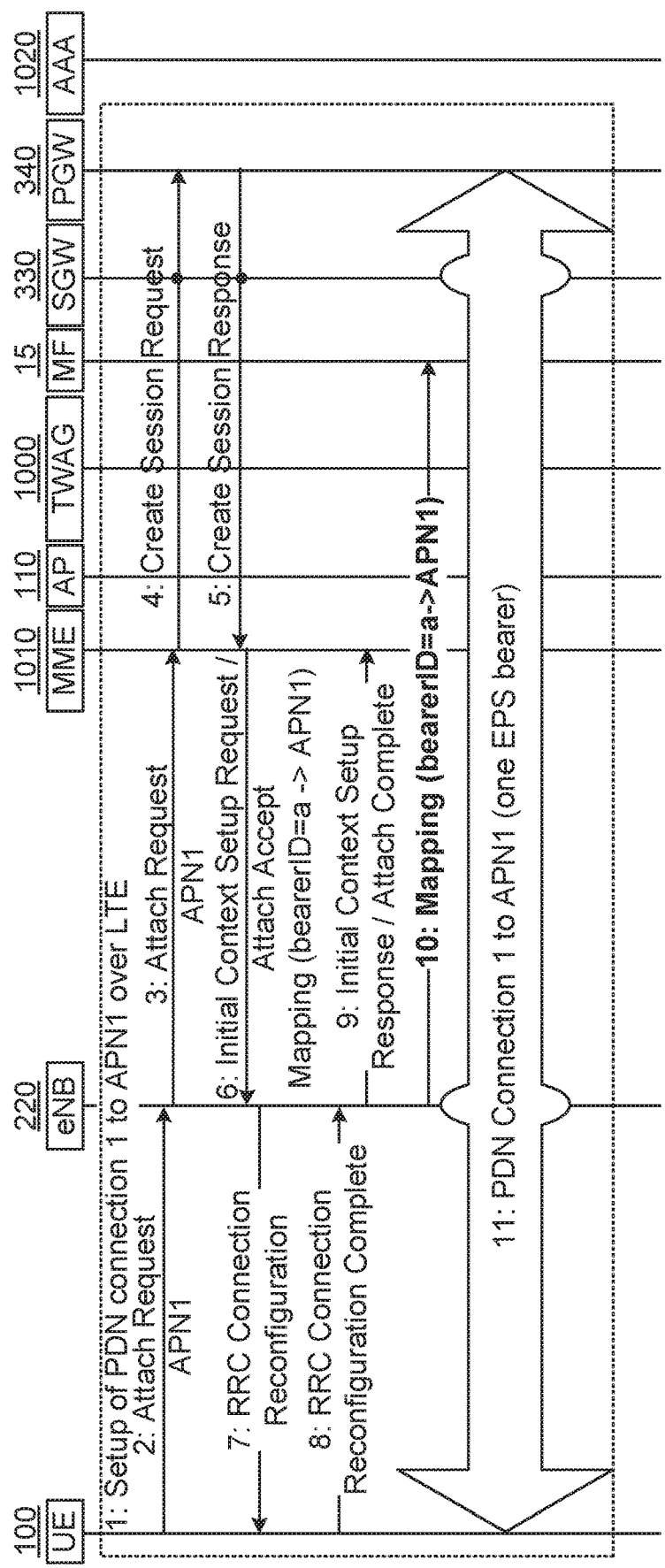
FIGS. 10A and 10B illustrate a schematic call flow for setting up two PDN connections, in accordance with the present disclosure.
Figure 10B:
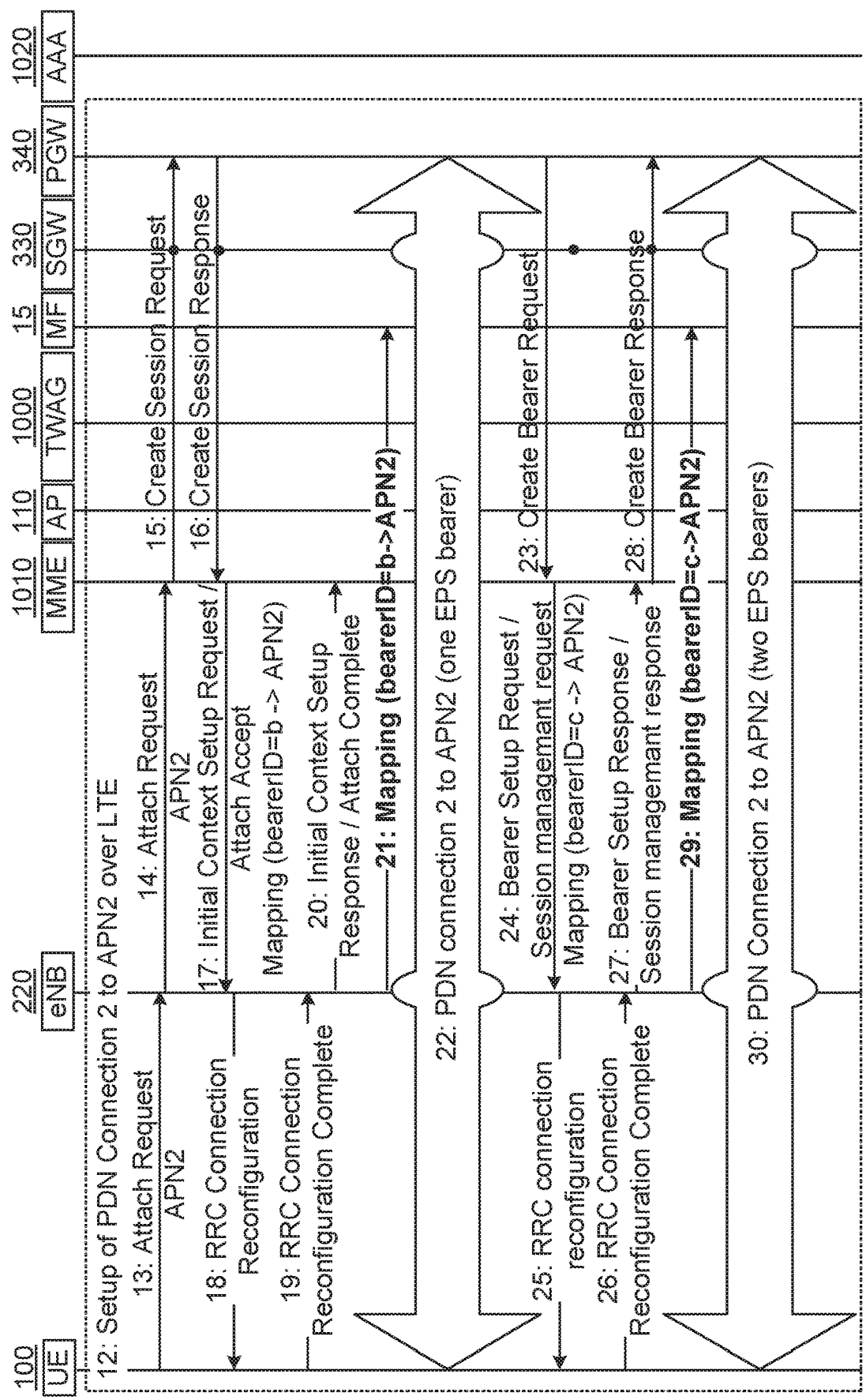

With reference to FIGS. 10A and 10B, two PDN connections are setup via LTE (block 1 and block 12). The first PDN connection is towards APN1 (e.g., the Internet APN), whereas the second PDN connection is towards APN2 (e.g., the IMS APN). The first PDN connection consists of only a single bearer. The second PDN connection has two bearers; the setup of the second bearer is initiated from the PGW 340. The setup procedures in this example are simplified and based on 3GPP TS 23.401, sections 5.3.2 and 5.4.1. It is noted that FIGS. 10A and 10B indicate the presence of an authentication, authorization and accounting (AAA) server 1020, although it does not actively take part in the call flow shown in the figure (but does take part in the call flow of FIG. 12).

One new operation in the setup of the connections and bearers lies in step 6 where the MME 1010 sends a mapping (bearer ID→APN) as part of the S1-MME signalling. The eNB then sends this mapping to the MF (step 10). Currently the RAN 200 (eNB 220, MF 15) is not aware of the relation between bearers and the APN or the PDN Connection.

Figure 11:
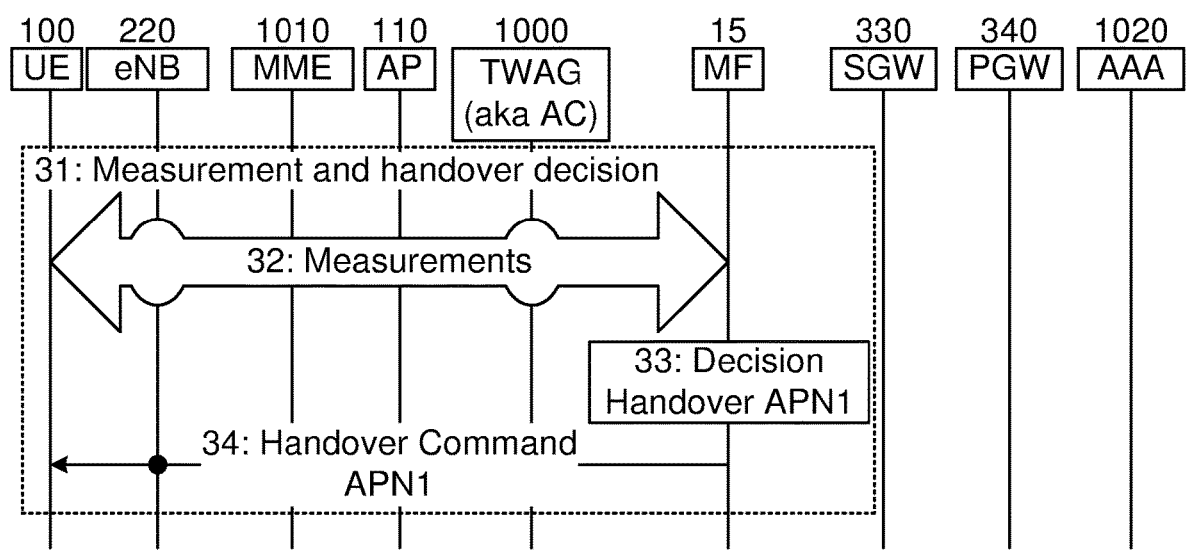
FIG. 11 is a schematic call flow for initiating a handover, in accordance with the present disclosure.

Referring to FIG. 11, once the PDN connections have been setup, the MF 15 requests measurements from the UE 100 (step 32). Eventually, the MF may decide to initiate a handover (step 33). In this example, it decides to handover APN1. It instructs the UE 100 to do so by indicating APN1 in the handover command (step 34). Because the MF is now aware of the mapping between the bearer ID and the APN, the MF 15 can make a decision based on APN. This is enabled by the bearer-to-APN mappings that were previously sent to the MF. The MF may base its decision on measurements combined with policies.

EXAMPLE

The MF 15 may be aware of the Quality-of-Service Class Indicator (QCI) for each bearer (it may have received this as part of step 10, 21, 29). BearerID=a and BearerID=b may have a QCI corresponding to "best effort", whereas BearerID=c may have a QCI corresponding to "voice". If the MF, based on the received measurement reports, concludes that best effort can be moved to WLAN, but not voice, then it may instruct to move APN1 to WLAN 115 as all the bearers associated with APN1 (bearer a) fit this criteria (best effort and not voice).

Figure 4:
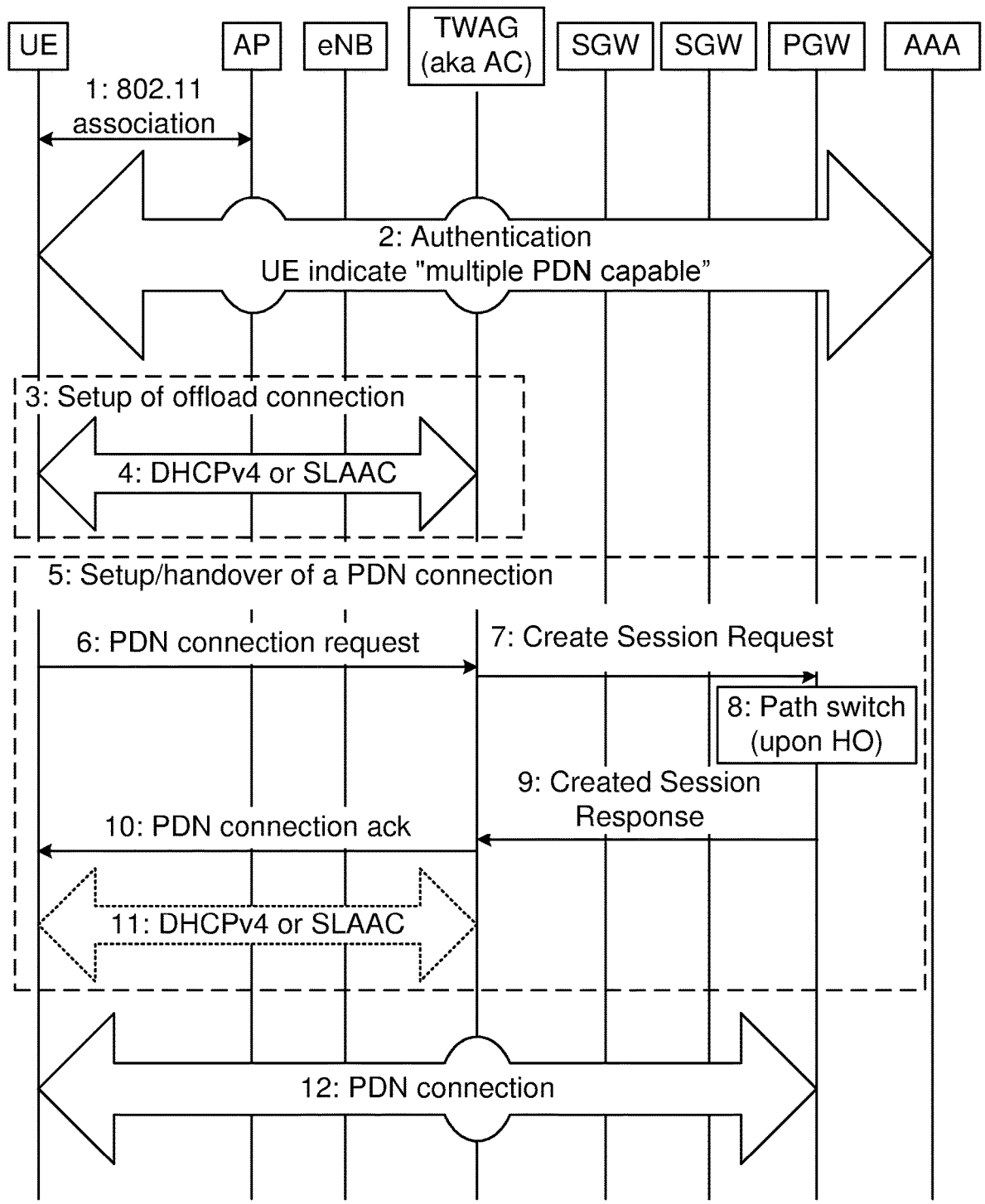
FIG. 4 is a schematic call flow in a multi-PDN scenario.
Figure 5:
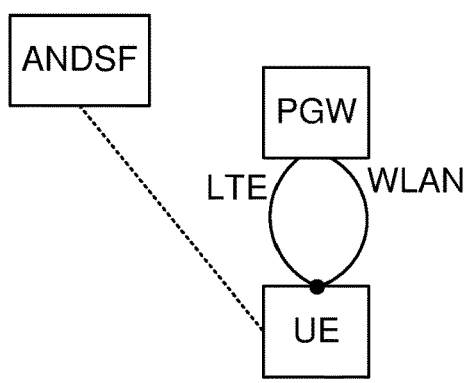
FIG. 5 schematically illustrates the concept of IFOM.
Figure 6:
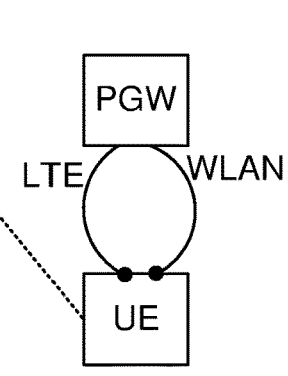
FIG. 6 schematically illustrates the concept of MAPCON.
Figure 12:
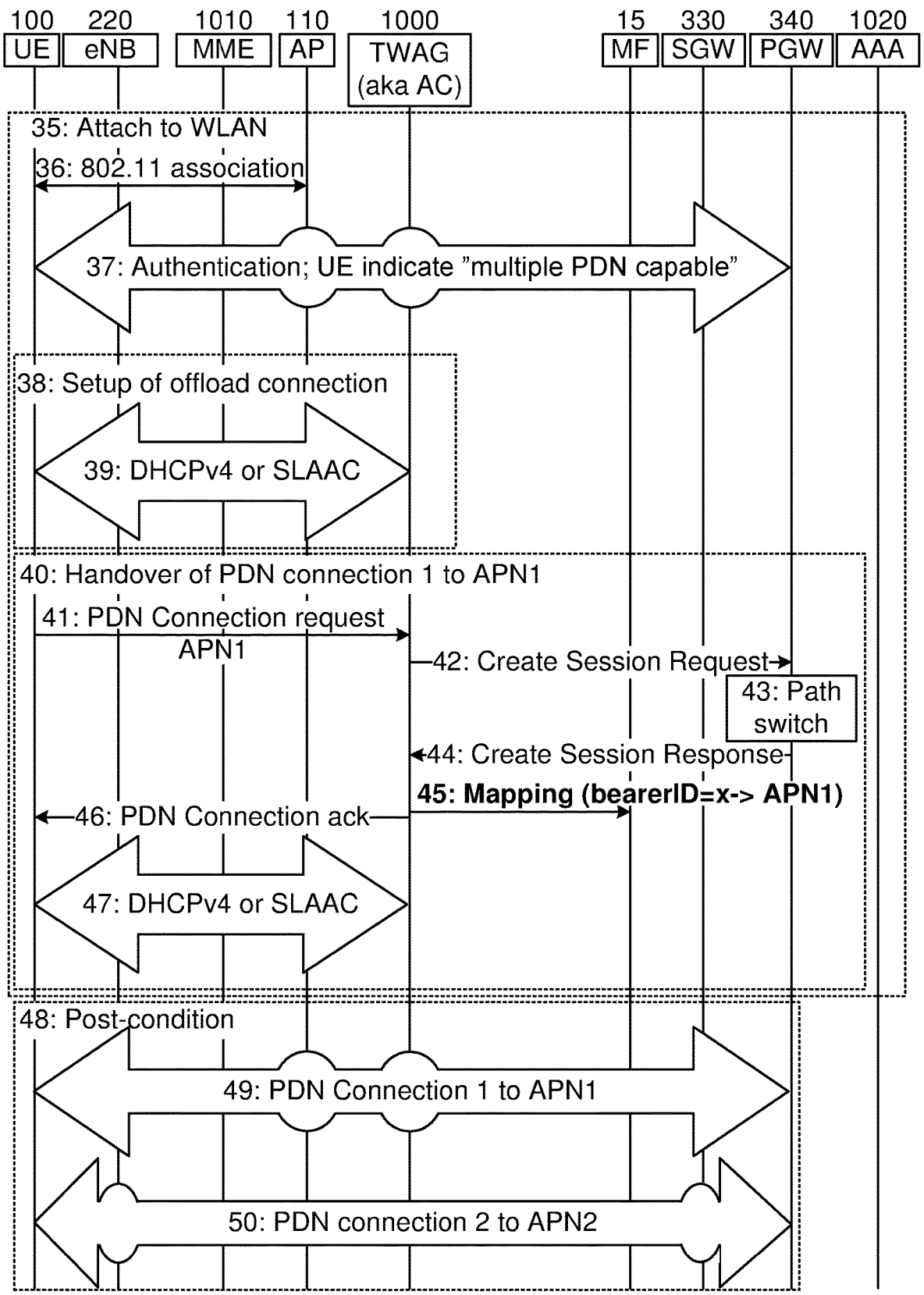
FIG. 12 is a schematic call flow for performing a handover, in accordance with the present disclosure.

The actual attachment to WLAN and the handover procedure (block 35) is illustrated in FIG. 12 based on the procedure of FIG. 4—Future multi-PDN scenario—in the background section. Note that in the presently disclosed procedure, the TWAG 1000 informs the MF 15 of the mapping (step 45). In this example, the first PDN connection to APN1 only has a single bearer. If it would have had multiple bearers, the MF would inform the TWAG for the mapping of each individual bearer.

Note that the new bearerID=x corresponds to the original bearerID=a on the LTE side. The value of x and a may be the same, but this is not necessarily the case. In today's 3GPP specification the bearerID values are not kept upon a handover between LTE and WLAN (in general, these are not kept between 3GPP and a non-3GPP access).

In the example call flow of FIGS. 10-12, subsequent measurements can be performed after the handover to WLAN 115. Block 31 can thus be repeated and eventually the MF 15 may take additional decisions; e.g., to also move the second PDN connection to APN2 to WLAN, or to move the first PDN connection to APN1 back to LTE 200. Moving from LTE to WLAN would be a similar extension to existing handover procedures. Also in this direction, the MF includes an APN identifier in the handover command to the UE 100, and the eNB 220 sends the new mappings to the MF 15.

An advantage of the solution above is that it reduces the impact on the network nodes (PGW, SGW, MME, etc). The solution assumes a MAPCON-capable UE 100. These UEs are now appearing on the market. Note that in this solution, the bearerID values are kept within the network and do not need to be known by the UE for the purpose of selective handover.

If the measurements (step 32) are always to be reported via LTE, then a problem arises when all PDN connections of a UE 100 are moved to WLAN 115. The UE will then get detached from LTE 200. To prevent this, the UE could keep at least one PDN connection over LTE. This may be achieved by a policy—e.g., if there is a PDN connection over LTE to a particular APN (e.g., IMS), then the network 1 never instructs to move that APN to WLAN 115. Alternatively, a "dummy PDN connection" could be used. The sole purpose of such a PDN connection would be to keep the LTE connection up. Such PDN connection is just a normal PDN connection. The difference is that it would not be used to carry any user plane traffic, although it could be used to do so. As any PDN connection, the dummy PDN connection would be towards a particular APN. This may be a "dummy APN" that is explicitly configured by the operator for the sole purpose of setting up a dummy PDN connection. The setup of a PDN connection is done by the UE 100 prior to handover. The network 1 may trigger the UE to do so, e.g. by indicating this in the handover command (step 34).

In the example above, the bearerID is sent to the MF 15 from the eNB 220 and TWAG woo respectively. However, any other network node that is aware of the bearerID could send this information. On the 3GPP access, this could be MME 1010 or SGW 330 or PGW 340. On the WLAN access, this could be PGW 340.

RAN-Controlled Handover of all UE Traffic Belonging to a Specific PDN Connection The current 3GPP specification mandates that all PDN connections to a specific APN are always routed via the same access. In this respect, handover of a specific PDN connection is not relevant. However, the procedure described in the previous section could be upgraded to also support handovers on a PDN connection granularity instead of an APN granularity.

A PDN connection can be uniquely identified by the combination of APN and IP address/prefix of the PDN connection. So if the mappings described in the previous section contain (bearerID→APN+IP) then the MF 15 can make its decision on PDN connection granularity. The MF would then signal APN+IP to the UE 100 as part of the handover command. A disadvantage of this approach is that the IP address/prefix is not known by the eNB 220, and is not always known by MME 1010 and SGW 330 in today's specifications. This could of course be added for this purpose.

An alternative solution would be based on using the existing linked bearer identification (LBI). Each PDN connection has at least one bearer, the so called default bearer. That default bearer gets assigned the LBI. When any additional bearer for the same PDN connection is setup, then control signalling related to the setup of that additional bearer also carries the LBI. The LBI is thus available in all relevant network nodes and can be used to uniquely identify the PDN connection. The node that sends mapping to the MF would then send (bearerID→LBI). In this case the eNB/TWAG/etc and MF need not be aware of the UE IP addresses. The MF could then signal LBI to the UE as part of the handover command.

The alternative solution implies that the UE 100 needs to be aware of bearerIDs. Today this is already supported for those bearers over LTE. However, for WLAN, there is no bearer concept. As a consequence, the UE is not aware of any bearerID for PDN connections over WLAN. However, it is also possible to introduce the bearer concept on WLAN, in which case bearer definitions can be sent from the Trusted Wireless Access Gateway (TWAG) to the UE. This may be extended by also sending the bearerID (e.g., S2a bearer ID and the LBI).

RAN-Controlled Handover of all UE Traffic Belonging to a Specific Bearer within a Specific PDN The granularity of the traffic to handover can be further refined to bearer level. This would require an IFOM-capable UE 100.

Continuing the example from the previous section: The MF 15 may be aware of the Quality-of-Service (QCI) for each bearer (it may have received this as part of step 10, 21, 29). BearerID=a andBearerID=b may have a QCI corresponding to "best effort", whereas BearerID=c may have a QCI corresponding to "voice". If the MF, based on the received measurement reports, concludes that best effort traffic can be moved to WLAN 115, but not voice traffic, then it may instruct to move BearerID=a and BearerID=b to WLAN. Or the instruction can contain the QCI(s) of the bearers to be moved without explicitly stating the bearer IDs.

To achieve this, the MF 15 indicates the BearerIDs and an "IFOM flag" in the handover command. If the QCI of each bearer is also know to the UE 100, then instead of indicating specific BearerIDs, the MF alternatively indicates "all bearers that have QCI=x". The UE in its turn indicates "IFOM" in the attachment to WLAN 115. In the example above, the UE performs an IFOM handover to WLAN for both active PDN connections.

Note that an IFOM PDN connection is active over multiple accesses simultaneously. The UE will therefore stay connected over LTE and no "dummy PDN connection" (as described above) is needed.

A disadvantage of this approach may be that IFOM over S2a is not supported in today's specifications. Only IFOM for S2c is supported. However, there are no real deployments. A study in 3GPP SA2 to introduce IFOM over S2a is ongoing. Another disadvantage, already mentioned in the previous section, may be that WLAN currently does not support the bearer concept. Also, for the handover solution based on IFOM PDN connection, it will be required that the UE 100 is made aware of the bearerIDs for those bearers over WLAN 115.

MF Making Decisions Based on QCI

In the previous three sections, examples are given where the MF 15 considers QCI in making its decisions regarding what to handover. This section presents details of how QCI can be used to refine the granularity of traffic steering.

The QCI value range is 255. Ten values are standardized. Using more than 10 values allows traffic steering with high granularity. According to this approach, the 3GPP core network, prior to sending the handover command, assigns different QCI values to different types of traffic to allow for a suitable traffic steering granularity. For example, the 3GPP core network may assign QCI value 17 to a video streaming and QCI value 23 for web browsing. The MF may then indicate to the UE that a particular QCI value, e.g., QCI value of 23, should be offloaded to WLAN. In this particular example, this would ensure that the video streaming traffic is kept on LTE while the web browsing is steered to WLAN.

The setting of the QCI is done in the core network, which may be aware of not only the type of traffic but may also have more detailed information about the services, whereas the access network (LTE or WLAN) usually does not have such information. For example, the core network may be able to identify YouTube traffic from peer-to-peer file sharing, but the access network does usually not have such information. If this is the case, the core network may give different QCI values for the YouTube traffic and the peer-to-peer file sharing which can then be used to steer these services individually. One alternative is that if the MF performs the traffic steering but the core aids the MF in doing the service differentiation by first giving different QCI values to different services and then indicating to the MF that QCI X can be moved to WLAN, but that QCI Y should not be moved to WLAN. Note that the QCI value of a bearer can also be changed after setup, by means of the existing bearer modification procedures.

It may also be possible to have some semi-static mapping that can be used to differentiate bearers that can be moved or not. For example, QCI range a to b can be allocated to bearers that shouldn't be moved to WLAN 115, while QCI range a+n to b+n is set for those that can be moved. Initially, when a bearer is setup in 3GPP it will take a QCI value between a and b. If it is later decided that this bearer is to be moved, then a bearer modification procedure is initiated to change the QCI value of that bearer to the original value plus n, implicitly telling the UE that this bearer is to be moved to WLAN.

Possible Handover Command Implementation

This section describes one possibility on how the handover command (step 34 in the call flow of FIG. 11) can be implemented. This implementation is valid when the handover command is sent via the 3GPP RAN 200 signalling.

Figure 13:
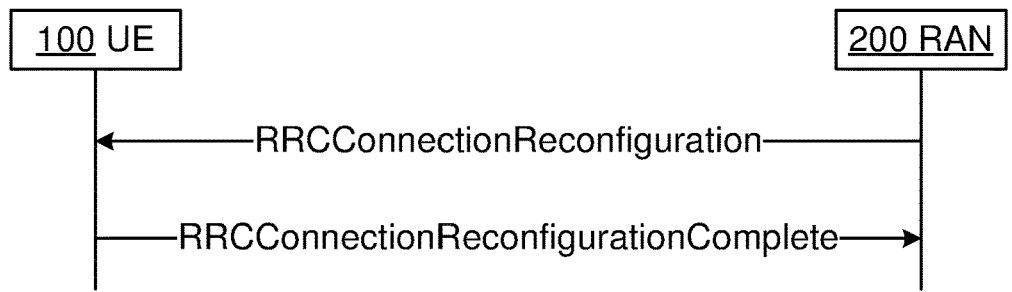
FIG. 13 is a schematic call flow for an example handover command, in accordance with the present disclosure.

With reference to FIG. 13, the 3GPP RAN 200 signals to the UE 100 an RRCConnectionReconfiguration message containing an information element that in turn contains all or a subset of the information necessary to perform the mobility to WLAN 115. In the below example this information element is called MobilityControlInfoWlan. The information element MobilityControlWlan may be optionally present in the RRCConnectionReconfiguration message meaning that it is only included by the 3GPP network when mobility to WLAN shall be performed, if not the information element will be omitted.

Note that the message RRCConnectionReconfiguration and information element MobilityControlWlan may contain other information than what is shown in this example. However, to simplify the example, only the parameters related to the above text have been included.

The UE 100 will, upon reception of an RRCConection-Reconfiguration message determine if the information element mobilityControlWlan is included and in such case perform the WLAN offloading as explained in the above embodiments.

```
-- ASN1START
RRCConnectionReconfiguration ::= SEQUENCE {
    mobilityControlInfoWlan         MobilityControlInfoWlan
        OPTIONAL,
}
MobilityControlInfoWlan information element
-- ASN1START
MobilityControlInfoWlan ::=    SEQUENCE {
    targetSSID                      OCTET STRING,
    apn-identifier                  APN-Identifier
        OPTIONAL,
    bearer-identifier               Bearer-Identifer
        OPTIONAL,
    qci-identifier                  QCI-Identifier
        OPTIONAL,
    linkedBearerIdentifier          LinkBearerIdentify
        OPTIONAL,
    dummy-apn-identifier            APN-Identifier
        OPTIONAL
}
APN-Identifier ::=              SEQUENCE (SIZE (1..10)) OF
OCTET_STRING
Bearer-Identifier ::=           SEQUENCE (SIZE (1..10)) of INTEGER
(0..128)
QCI-Identifier ::=              SEQUENCE (SIZE (1..10)) OF
INTEGER (0..128)
LinkBearerIdentify ::=          SEQUENCE (SIZE (1..10)) OF
INTEGER (0..128)
-- ASN1STOP
```

The ranges given in the above example commands are not critical—other ranges are also possible.

There may be 0, 1 or more than 1 instances of apn-identifier, bearer-identifier, qci-identifier, and linked-BearerIdntifier in the MobilityControlInfoWlan information element. For example, if the handover command instructs the UE 100 to handover two APNs, then MobilityControlInfoWlan contains two occurrences of apn-identifier.

When the dummy-apn-identifier is present, it serves as a trigger for the UE to setup a PDN connection to the dummy APN. The MF would include that if it instructs the UE 100 to move the last bearer from LTE 200 to WLAN 115, but it wants the UE to stay connected over LTE. In the example here the APN string is sent to the UE. Alternatively, the string is already available in the UE; e.g. by pre-configuration, by ANDSF, or received at attachment. In such case the string would not be needed in the RRCConnectionReconfiguration message. Instead, a boolean trigger indicator would suffice.

Figure 14:
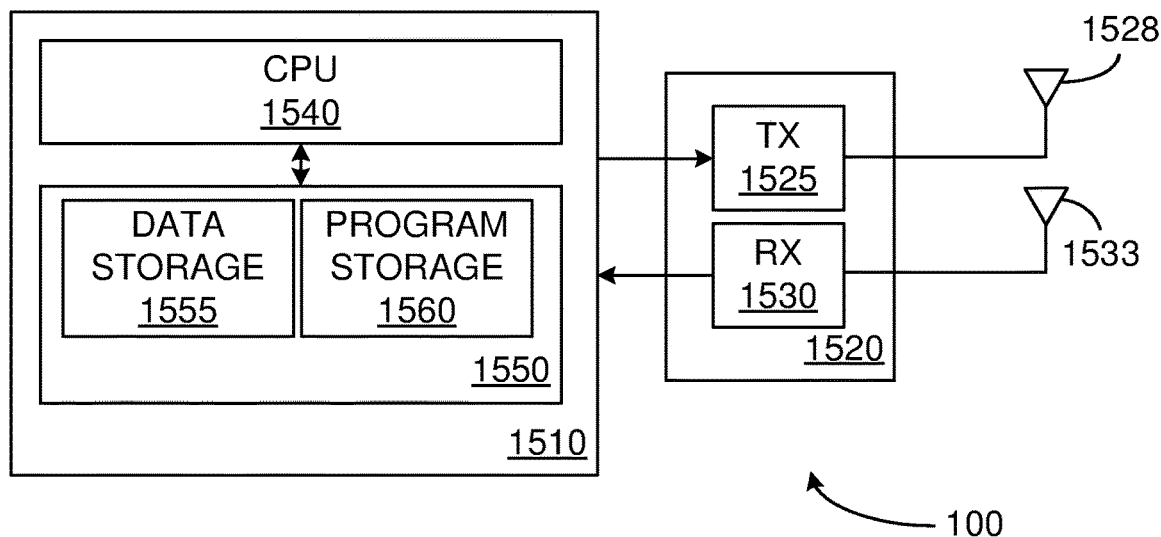
FIG. 14 is a schematic block diagram of an embodiment of a radio device, in accordance with the present disclosure.

Several of the techniques and methods described above may be implemented using radio circuitry and electronic data processing circuitry provided in a radio device 100. FIG. 14 illustrates features of an example radio device/UE 100 according to several embodiments of the present disclosure.

The radio device 100, which may be a UE configured for operation with an LTE network (E-UTRAN) and that also supports Wi-Fi, for example, comprises a transceiver unit 1520 for communicating with one or more base stations 220, 230, 240 as well as a processing circuit 1510 for processing the signals transmitted and received by the transceiver unit 1520. Transceiver unit 1520 includes a transmitter 1525 coupled to one or more transmit antennas 1528 and receiver 1530 coupled to one or more receiver antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE. Note also that transmitter unit 1520 may comprise separate radio and/or baseband circuitry for each of two or more different types of radio access network, such as radio/baseband circuitry adapted for E-UTRAN access and separate radio/baseband circuitry adapted for WiFi access. The same applies to the antennas—while in some cases one or more antennas may be used for accessing multiple types of networks, in other cases one or more antennas may be specifically adapted to a particular radio access network or networks. Because the various details and engineering trade-offs associated with the design and implementation of such circuitry are well known and are unnecessary to a full understanding of the disclosure, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 14, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Because radio device 100 supports multiple radio access networks, processing circuit 1510 may include separate processing resources dedicated to one or several radio access technologies, in some embodiments. Again, because the various details and engineering trade-offs associated with the design of baseband processing circuitry for mobile devices are well known and are unnecessary to a full understanding of the disclosure, additional details are not shown here.

Typical functions of the processing circuit 1510 include modulation and coding of transmitted signals and the demodulation and decoding of received signals. In several embodiments of the present disclosure, processing circuit 1510 is adapted, using suitable program code stored in program storage memory 1560, for example, to carry out one of the techniques described above for access network selection. Of course, it will be appreciated that not all of the steps of these techniques are necessarily performed in a single microprocessor or even in a single module.

Figure 15:
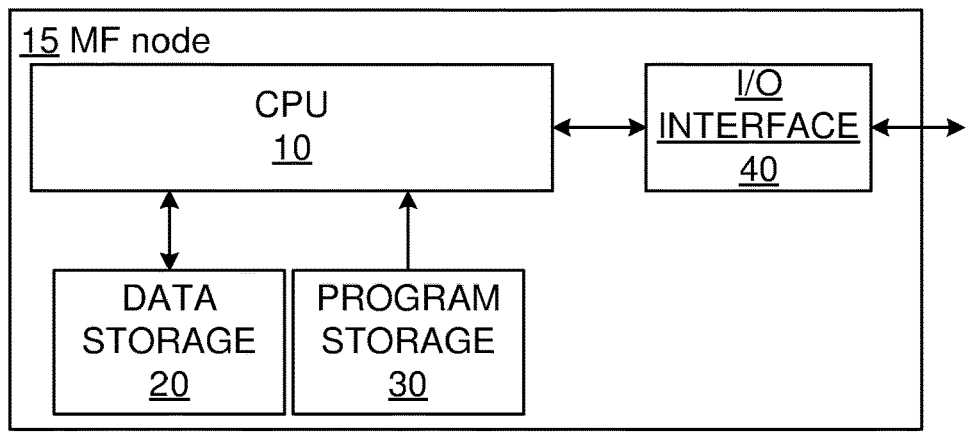
FIG. 15 is a schematic block diagram of an embodiment of a mobility function node, in accordance with the present disclosure.

Similarly, several of the techniques and processes described above can be implemented in a network node, such as an eNodeB 220 or other node in a 3GPP network. FIG. 15 is a schematic illustration of an MF node 15 in which a method embodying any of the presently described network-based techniques can be implemented. A computer program for controlling the node 15 to carry out a method embodying the present disclosure is stored in a program storage 30, which comprises one or several memory devices. Data used during the performance of a method embodying the present disclosure is stored in a data storage 20, which also comprises one or more memory devices. During performance of a method embodying the present disclosure, program steps are fetched from the program storage 30 and executed by a Central Processing Unit (CPU) 10, retrieving data as required from the data storage 20. Output information resulting from performance of a method embodying the present disclosure can be stored back in the data storage 20, or sent to an Input/Output (I/O) communication interface 40, which includes a network interface for sending and receiving data to and from other network nodes and which may also include a radio transceiver for communicating with one or more radio devices 100.

Accordingly, in various embodiments of the disclosure, processing circuits, such as the CPU 10 in FIG. 15, are configured to carry out one or more of the techniques described in detail above. Likewise, other embodiments include radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

FIG. 16 schematically illustrates an embodiment of a base station 220 (also relevant for the base stations 230 and 240) of the present disclosure. The base station 220 comprises processor circuitry 160 e.g. a central processing unit (CPU). The processor circuitry 160 may comprise one or a plurality of processing units in the form of microprocessor(s). However, other suitable devices with computing capabilities could be comprised in the processor circuitry 160, e.g. an application specific integrated circuit (ASIC), a field programmable gate array (FPGA) or a complex programmable logic device (CPLD). The processor circuitry 160 is configured to run one or several computer program(s) or software 171 (see also FIG. 17) stored in a storage 161 of one or several storage unit(s) e.g. a memory. The storage unit is regarded as a computer readable means as discussed herein and may e.g. be in the form of a Random Access Memory (RAM), a Flash memory or other solid state memory, or a hard disk, or be a combination thereof. The processor circuitry 160 may also be configured to store data in the storage 161, as needed. The base station 220 also comprises a communication interface 160 comprising a radio communication interface for radio communication with one or more radio devices 100, as well as an interface for communication with other nodes in the 3GPP network.

FIG. 17 illustrates a computer program product 170. The computer program product 170 comprises a computer readable medium 172 comprising a computer program 171 in the form of computer-executable components 171. The computer program/computer-executable components 171 may be configured to cause an MF node 15 or a base station 220, e.g. as discussed herein to perform an embodiment of a method of the present disclosure. The computer program/computer-executable components may be run on the processor circuitry 10/160 of the node 15/base station 220 for causing it to perform the method. The computer program product 170 may e.g. be comprised in a storage unit or memory 30/161 comprised in the node 15/base station 220 and associated with the processor circuitry 10/160. Alternatively, the computer program product 170 may be, or be part of, a separate, e.g. mobile, storage means, such as a computer readable disc, e.g. CD or DVD or hard disc/drive, or a solid state storage medium, e.g. a RAM or Flash memory.

FIG. 18a is a schematic flow chart of an embodiment of a method of the present disclosure. The method is performed in a mobility function (MF) node 15 in a communication network 1. The MF node 15 receives S1 information about a mapping to a property, of each of a plurality of radio bearers of a radio device 100 for carrying data traffic between the radio device 100 and a first RAN 200 or 115. The property may e.g. be APN, PDN connection or bearer ID, as discussed herein. Based on the received S1 information, the MF node 15 determines S2 that at least one of the radio bearers can be handed over to a second RAN 115 or 200. Then, the MF node 15 initiates S3 a handover command to the radio device 100 instructing the radio device to hand over the at least one radio bearer to the second RAN, e.g. by instructing a base station 220, 230 or 240 to send such a handover command to the radio device 100.

FIG. 18b is a schematic flow chart of another embodiment of a method of the present disclosure. In addition to the steps S1-S3 discussed with reference to FIG. 18a, the MF node 15 may receive S4 measurement data of the mobile terminal 100, said measurement data relating to measurements made by the mobile terminal on the first and/or second RAN 115/200. Then, the determining S2 that the at least one radio bearer between the radio device 100 and a first RAN can be handed over to a second RAN may be based also on said received measurement data in combination with policies predefined in the MF node 15. Additionally or alternatively, the MF node 15 may receive S5 quality-of-service class indicator (QCI) information for each of the radio bearers, e.g. from a core network (CN) node via a base station. The QCI information may e.g. be related to the type of data traffic of each radio bearer. Then, said determining S2 may also be based on said QCI information.

FIG. 19 is a schematic flow chart of another embodiment of a method of the present disclosure. This method is performed by a base station 220, 230 or 240 of a cellular RAN 200. The base station receives S11 information about a mapping to a property, of each of a plurality of radio bearers of a radio device 100 for carrying data traffic between the radio device 100 and the cellular RAN 200. Then, the base station forwards S12 the mapping information to an MF node 15 for use in determining that at least one of the radio bearers can be handed over to a WLAN RAN 115.

With the solutions described herein, a RAN 200 or 115 is enabled to move only part of a UE's 100 traffic between different accesses, instead of moving all of the UE's traffic. It will be appreciated by the person of skill in the art that various modifications may be made to the above described embodiments without departing from the scope of the present disclosure. For example, it will be readily appreciated that although the above embodiments are described with reference to parts of a 3GPP network, an embodiment of the present disclosure will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present disclosure have been described in detail above, with reference to the attached illustrations of specific embodiments. Because it is not possible, of course, to describe every conceivable combination of components or techniques, those skilled in the art will appreciate that the present disclosure can be implemented in other ways than those specifically set forth herein, without departing from essential characteristics of the disclosure. The present embodiments are thus to be considered in all respects as illustrative and not restrictive.

Below follow some other aspects and embodiments of the present disclosure.

In some embodiments of the present disclosure, the received S1 information about mapping to a property comprises information about to which APN each of the radio bearers is mapped, and the radio bearers comprise at least one radio bearer mapped to a first APN and at least one radio bearer mapped to a second APN, wherein the determining S2 comprises determining that the at least one radio bearer mapped to the first APN should be handed over to the second RAN 200 or 115.

In some embodiments of the present disclosure, the received S1 information about mapping to a property comprises information about to which PDN connection each of the radio bearers is mapped, and the radio bearers comprise at least one radio bearer mapped to a first PDN connection and at least one radio bearer mapped to a second PDN connection, wherein the determining S2 comprises determining that the at least one radio bearer mapped to the first PDN connection should be handed over to the second RAN 200 or 115. In some embodiments, the received S1 information comprises IP addresses associated with each of the radio bearers, and/or the linked bearer identification (LBI) associated with each of the radio bearers.

In some embodiments of the present disclosure, the received S1 information about mapping to a property comprises bearer IDs for each of the radio bearers, and the determining S2 comprises determining that at least one of the radio bearers as identified by its bearer ID should be handed over to the second RAN 200 or 115.

In some embodiments of the present disclosure, the determining S2 comprises determining that bearers associated with a specific QCI or range of QCIs can be handed over to the second RAN 115 or 200.

In some embodiments of the present disclosure, the first RAN is a cellular RAN 200 and the second RAN is a WLAN 115. In some embodiments, the received S1 information about mapping to a property is received S1 from a CN node via a base station 220, 230 or 240 in the first RAN 200.

In some other embodiments of the present disclosure, the first RAN is a WLAN 115 and the second RAN is a cellular RAN 200. In some embodiments, the received S1 information about the mapping is received S1 from a trusted wireless access gateway (TWAG) 1000 associated with the WLAN 115.

In some embodiments of the present disclosure, the handover command is configured to instruct the radio device 100 to hand over at least one but fewer than all of the radio bearers of the radio device.

In some embodiments of the present disclosure, the handover command comprises a Radio Resource Control (RRC) Connection Reconfiguration message comprising one or more parameters used for the hand over.

In some embodiments of the present disclosure, the mapping information is received S11 by the base station 220, 230 or 240 from a core network node, e.g. from a mobility management entity (MME) 1010, before it is forwarded S12 to the MF node 15.

According to an aspect of the present disclosure, there is provided a mobility function (MF) node 15 for a communication network 1. The MF node 15 comprises means (e.g. the processing circuitry 10 in cooperation with the communication interface 40) for receiving S1 information about a mapping to a property, of each of a plurality of radio bearers of a radio device 100 for carrying data traffic between the radio device 100 and a first RAN 200 or 115. The MF node also comprises means (e.g. the processing circuitry 10) for determining S2, based on the received S1 information, that at least one of the radio bearers can be handed over to a second RAN 115 or 200. The MF node also comprises mans (e.g. the processing circuitry 10 in cooperation with the communication interface 40) for initiating S3 a handover command to the radio device 100 instructing the radio device to hand over the at least one radio bearer to the second RAN.

According to another aspect of the present disclosure, there is provided a base station 220, 230 or 240 for a cellular RAN 200. The base station comprises means (e.g. the processing circuitry 160 in cooperation with the communication interface 162) for receiving S11 information about a mapping to a property, of each of a plurality of radio bearers of a radio device 100 for carrying data traffic between the radio device 100 and the cellular RAN 200. The base station also comprises means (e.g. the processing circuitry 160 in cooperation with the communication interface 162) for forwarding S12 the mapping information to an MF node 15 for use in determining that at least one of the radio bearers can be handed over to a WLAN RAN 115.

According to another aspect of the present disclosure, there is provided a method, in a base station 220, 230 or 240 of a cellular radio access network 200. The method comprises receiving a mapping of radio bearers to corresponding Access Point Names (APN) for a mobile terminal 100. The method also comprises forwarding the mapping to a mobility function (MF) node 15, for use in determining whether all or part of data traffic with the mobile terminal 100 can be handed over to a wireless local area network (WLAN) 115 connection.

According to another aspect of the present disclosure, there is provided a method, in a mobility function (MF) node 15. The method comprises receiving a mapping of radio bearers to corresponding Access Point Names (APNs) for a mobile terminal 100. The method also comprises receiving measurement data from or for the mobile terminal 100. The method also comprises determining, based on the measurement data, that all or part of data traffic between the mobile terminal and a first radio access network (RAN) 200 or 115 can be handed over to a second RAN 200 or 115. The method also comprises sending a handover command to the mobile terminal 100 instructing the mobile terminal to handover all or part of the data traffic to the second RAN.

In some embodiments, the data traffic between the mobile terminal 100 and the first RAN comprises traffic two and/or from two or more APNs, wherein said determining comprises deciding that some but less than all of the traffic should be handed over to the second RAN, and wherein said handover command instructs the mobile terminal to hand over traffic corresponding to at least one but fewer than all of the APNs.

In some embodiments, the determining is based on a quality-of-service class indicator (QCI) for each of one or more of the radio bearers.

In some embodiments, the first RAN is a cellular RAN 200 and the second RAN is a wireless local-area network (WLAN) 115. In some embodiments, the mapping is received from a base station 220, 230 or 240 in the first RAN 200.

In some other embodiments, the first RAN is a wireless local-area network (WLAN) 115 and the second RAN is a cellular RAN 200. In some embodiments, the mapping is received from a trusted wireless access gateway (TWAG) 1000 associated with the WLAN 115.

In some other embodiments, the mapping identifies multiple PDN connections for the mobile terminal 100, and wherein said handover command instructs the mobile terminal to hand over at least one but fewer than all of the PDN connections.

In some other embodiments, the handover command instructs the mobile terminal 100 to hand over at least one but fewer than all of the bearers for the mobile terminal.

In some embodiments, said determining that all or part of data traffic between the mobile terminal 100 and a first radio access network (RAN) 200 or 115 can be handed over to a second RAN 200 or 115 comprises determining that individual bearers should be handed over based on a quality-of-service class indicator (QCI) corresponding to each bearer. In some embodiments, said handover command instructs the mobile terminal to hand over bearers associated with a specific QCI or range of QCIs. In some embodiments, the method further comprises receiving QCI information for radio bearers for the mobile terminal 100 from a core network node 1010.

In some embodiments, said handover command comprises a Radio Resource Control (RRC) Connection Reconfiguration message comprising one or more parameters used for the hand over.

According to another aspect of the present disclosure, there is provided a mobility function (MF) node 15 comprising a communication interface 40 configured for communicating with one or more nodes of at least a first radio access network (RAN) 200 or 115 and further comprising a processing circuit configured to carry out an embodiment of a method of the present disclosure.

According to another aspect of the present disclosure, there is provided a mobility function (MF) node 15, comprising a receiver unit adapted to receive a mapping of radio bearers to corresponding Access Point Names (APNs) for a mobile terminal 100 and receive measurement data from or for the mobile terminal. The MF node 15 also comprises a handover decision unit adapted to determine, based on the measurement data, that all or part of data traffic between the mobile terminal 100 and a first radio access network (RAN) 200 or 115 can be handed over to a second RAN 200 or 115.

The MF node 15 also comprises a sending unit adapted to send, under the control of the handover decision unit, a handover command to the mobile terminal 100 instructing the mobile terminal to hand over all or part of the data traffic to the second RAN.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method, in a mobility function (MF) node, in a communication network, the method comprising:
   receiving information about a mapping to a property, of each of a plurality of radio bearers of a radio device for carrying data traffic between the radio device and a first radio access network (RAN);
   determining, based on the mapping, that at least one of the radio bearers can be handed over to a second RAN; and
   initiating a handover command to the radio device instructing the radio device to hand over the at least one radio bearer to the second RAN.

2. The method of claim 1, further comprising:
   receiving measurement data of the radio device, said measurement data relating to measurements made by the radio device on the first and/or second RAN;
   wherein the determining that the at least one radio bearer between the radio device and a first RAN can be handed over to a second RAN is based also on said received measurement data in combination with policies pre-defined in the MF node.

3. The method of claim 1, wherein the information about mapping to a property comprises information about to which Access Point Name (APN) each of the radio bearers is mapped, and wherein the radio bearers comprise at least one radio bearer mapped to a first APN and at least one radio bearer mapped to a second APN, wherein said determining comprises determining that the at least one radio bearer mapped to the first APN should be handed over to the second RAN.

4. The method of claim 1, wherein the information about mapping to a property comprises information about to which PDN connection each of the radio bearers is mapped, and wherein the radio bearers comprise at least one radio bearer mapped to a first PDN connection and at least one radio bearer mapped to a second PDN connection, wherein said determining comprises determining that the at least one radio bearer mapped to the first PDN connection should be handed over to the second RAN.

5. The method of claim 4, wherein the received information comprises IP addresses associated with each of the radio bearers, and/or the linked bearer identification (LBI) associated with each of the radio bearers.

6. The method of claim 1, wherein the information about mapping to a property comprises bearer IDs for each of the radio bearers, and wherein said determining comprises determining that at least one of the radio bearers as identified by its bearer ID should be handed over to the second RAN.

7. The method of claim 1, further comprising:
   receiving quality-of-service class indicator (QCI) information for each of the radio bearers, wherein said determining is also based on said QCI information.

8. The method of claim 7, wherein said determining comprises determining that bearers associated with a specific QCI or range of QCIs can be handed over to the second RAN.

9. The method of claim 1, wherein the first RAN is a cellular RAN and the second RAN is a wireless local-area network (WLAN).

10. The method of claim 9, wherein the information about mapping to a property is received from a CN node via a base station in the first RAN.

11. The method of claim 1, wherein the first RAN is a WLAN and the second RAN is a cellular RAN.

12. The method of claim 11, wherein the information about the mapping is received from a trusted wireless access gateway (TWAG) associated with the WLAN.

13. The method of claim 1, wherein the handover command is configured to instruct the radio device to hand over at least one but fewer than all of the radio bearers of the radio device.

14. The method of claim 1, wherein said handover command comprises a Radio Resource Control (RRC) Connection Reconfiguration message comprising one or more parameters used for the hand over.

15. A mobility function (MF) node for a communication network, the MF node comprising:
   a communication interface configured for communicating with one or more nodes of at least a first radio access network (RAN);
   processing circuitry; and
   a storage unit storing instructions executable by said processing circuitry whereby said MF node is operative to:
      receive information about a mapping to a property, of each of a plurality of radio bearers of a radio device for carrying data traffic between the radio device and the first RAN;
      determine, based on the mapping, that at least one of the radio bearers can be handed over to a second RAN; and
      initiate a handover command to the radio device instructing the radio device to handover the at least one radio bearer to the second RAN.

* * * * *